US00RE47626E

(19) United States
(12) Reissued Patent
Smith et al.

(10) Patent Number: US RE47,626 E
(45) Date of Reissued Patent: Oct. 1, 2019

(54) END TERMINAL

(71) Applicant: Energy Absorption Systems, Inc., Dallas, TX (US)

(72) Inventors: Brian Smith, Dallas, TX (US); Barry D. Stephens, Roseville, CA (US); Patrick A. Leonhardt, Loomis, CA (US)

(73) Assignee: ENERGY ABSORPTION SYSTEMS, INC., Dallas, TX (US)

(21) Appl. No.: 15/248,707

(22) Filed: Aug. 26, 2016

Related U.S. Patent Documents

Reissue of:
(64) Patent No.: 8,905,382
Issued: Dec. 9, 2014
Appl. No.: 13/362,155
Filed: Jan. 31, 2012

U.S. Applications:
(60) Provisional application No. 61/438,421, filed on Feb. 1, 2011.

(51) Int. Cl.
*E01F 15/04* (2006.01)
*E01F 15/14* (2006.01)

(52) U.S. Cl.
CPC ..... *E01F 15/143* (2013.01)

(58) Field of Classification Search
CPC ..... E01F 15/143; E01F 15/145; E01F 15/146
USPC ..... 256/13.1
See application file for complete search history.

(56) References Cited

U.S. PATENT DOCUMENTS 4,655,434 A 4/1987 Bronstad
4,678,166 A 7/1987 Bronstad et al.
4,838,523 A 6/1989 Humble et al.
4,928,928 A 5/1990 Buth et al.
5,022,782 A 6/1991 Gertz et al.
(Continued)

FOREIGN PATENT DOCUMENTS

EP 924347 A1 6/1999
WO WO 00/32878 A1 6/2000
WO WO 2009/137483 A1 11/2009

OTHER PUBLICATIONS

AB Varmförzinkning, "Roadside Protection—System W," www.varmforzinkning.se, believed to be publicly available prior to Jan. 31, 2012, 12 pages.

(Continued)

*Primary Examiner* — Peter C English
(74) *Attorney, Agent, or Firm* — Brinks, Gilson & Lione

(57) ABSTRACT

An end terminal for a guardrail system includes an elongated guardrail beam and a flattening or reshaping device defining a channel having an inlet and an outlet vertically aligned along a longitudinal axis. The guardrail beam is moveable along the longitudinal axis through the channel from the inlet to the outlet. An anchor is vertically spaced below the outlet, with a tether coupled between the anchor and an end portion of the guardrail beam. The tether is adapted to pull the guardrail beam downwardly from a first height at the outlet to a second height vertically spaced from the first height free of any engagement with any other structure once the guardrail beam exits the outlet, and with a bending of the deformed guardrail beam in only one direction after the deformed guardrail beam leaves the outlet. Methods of assembly and operation are also provided.

18 Claims, 2 Drawing Sheets

(56) References Cited

U.S. PATENT DOCUMENTS

| | | | | |
|---|---|---|---|---|
| 5,078,366 | A | 1/1992 | Sicking et al. | |
| 5,348,416 | A | 9/1994 | Ivey et al. | |
| 5,407,298 | A | 4/1995 | Sicking et al. | |
| 5,765,811 | A | 6/1998 | Alberson et al. | |
| 5,775,675 | A | 7/1998 | Sicking et al. | |
| 5,797,591 | A | 8/1998 | Krage | |
| 5,931,448 | A * | 8/1999 | Sicking et al. | 256/13.1 |
| 5,957,435 | A | 9/1999 | Bronstad | |
| 5,967,497 | A | 10/1999 | Denman et al. | |
| 6,022,003 | A | 2/2000 | Sicking et al. | |
| 6,142,452 | A | 11/2000 | Denman et al. | |
| 6,173,943 | B1 * | 1/2001 | Welch et al. | 256/13.1 |
| 6,409,417 | B1 | 6/2002 | Muller et al. | |
| 6,505,820 | B2 | 1/2003 | Sicking et al. | |
| 6,554,256 | B2 | 4/2003 | Ochoa | |
| 6,715,735 | B2 | 4/2004 | Bligh et al. | |
| 6,719,483 | B1 | 4/2004 | Welandsson | |
| 6,854,716 | B2 | 2/2005 | Bronstad | |
| 6,962,245 | B2 | 11/2005 | Ray et al. | |
| 7,111,827 | B2 | 9/2006 | Sicking et al. | |
| 7,185,882 | B2 * | 3/2007 | Buth et al. | 256/13.1 |
| 7,396,184 | B2 | 7/2008 | La Turner et al. | |
| 7,484,906 | B2 | 2/2009 | La Turner et al. | |
| 7,694,941 | B2 | 4/2010 | Abu-Odeh et al. | |
| 7,699,293 | B2 | 4/2010 | James | |
| 2009/0272955 | A1 | 11/2009 | Abu-Odeh et al. | E01F 15/143<br>256/13.1 |
| 2009/0272956 | A1 | 11/2009 | Abu-Odeh et al. | |

OTHER PUBLICATIONS

International Search Report from counterpart International Application No. PCT/US2012/023260, dated May 10, 2012, 1 page.

Written Opinion of the International Searching Authority from counterpart International Application No. PCT/US2012/023260, dated May 10, 2012, 6 pages.

* cited by examiner

END TERMINAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims the benefit of U.S. Provisional Application No. 61/438,421, filed Feb. 1, 2011, the entire disclosure of which his hereby incorporated herein by reference.

FIELD OF THE INVENTION

The present invention relates generally to an end terminal for a guardrail, and in particular, to an end terminal that deforms a guardrail beam so as to dissipate energy during an impact event with the end terminal.

BACKGROUND

Guardrails provide significant safety advantages, namely protecting errant vehicles from leaving the roadway and/or from various roadside hazards. For proper functioning, the guardrails are positioned at a height sufficient to safely redirect the errant vehicle, without the vehicle rolling over the top of, or diving under, the guardrail. While the guardrail may assume various cross-sectional shapes and configurations, one typical configuration is a "W" beam, with the shape and materials governed by the AASHTO M-180 Guardrail Specification. One problem with such guardrail systems is presented at the end of a section thereof, wherein a conventional guardrail section may present a spearing hazard to a vehicle impacting the end of the guardrail in a head-on collation.

In response, various solutions have been introduced, including turning down (twisting and anchoring) the end of the guardrail to ground level, which may lead to vehicles being vaulted into the air. Other solutions include providing for breakaway post systems, with the guardrails buckling or sliding past each other as one or more support posts are broken during an axial impact event. In other systems, the guardrail is both deformed and laterally deflected, thereby absorbing energy while also eliminating the spearing hazard. In yet another type of system, a deforming device is provided at the impact end of the guardrail, as shown in U.S. Pat. No. 6,719,483 to Welandsson and U.S. Pat. No. 7,694,941 to Abu-Odeh. In these types of systems, the deforming device deforms the guardrail and directs/transitions the guardrail downwardly and then horizontally at ground level, bending the guardrail in two different rotational directions, including one at ground level, during the impact sequence. As such, the devices may be difficult to set up, requiring a threading of a draw member, whether configured as a cable or a flattened portion of the guardrail, through the redirecting channel or tube of device. In addition to the added cost associated with the assembly and set up, the elaborately shaped deforming devices require additional materials and assembly costs.

Thus, the need remains for a low cost guardrail end terminal that dissipates the energy of an impacting vehicle, while reducing the risk of spearing.

SUMMARY

The present invention is defined by the following claims, and nothing in this section should be considered to be a limitation on those claims.

In one aspect, one embodiment of an end terminal for a guardrail system includes an elongated guardrail beam defining a longitudinal axis extending in a substantially horizontal plane. The beam has a vertical cross section defined by a plurality of inclined web portions joined to define upper and lower peaks and at least one valley positioned between the upper and lower peaks. The plurality of inclined webs includes at least an uppermost web portion and a lowermost web portion. A flattening device defines a channel having an inlet and an outlet vertically aligned along the longitudinal axis at a first height. The channel defines vertically spaced upper and lower forming surfaces. The guardrail beam is moveable along the longitudinal axis through the channel from the inlet to the outlet. The upper and lower forming surfaces engage respectively the uppermost and lowermost web portions as the guardrail beam is moved through the channel. The upper and lower forming surfaces are configured and arranged such that the plurality of inclined webs are each arranged in a substantially horizontal orientation one on top of the other as the guardrail beam exits the outlet of the channel along the longitudinal axis. An anchor is vertically spaced below the outlet. A tether is coupled between the anchor and an end portion of the guardrail beam located at the first height. The tether is adapted to pull the guardrail beam downwardly from the first height to a second height vertically spaced from the first height free of any engagement with any other end terminal structure once the guardrail beam exits the outlet.

In another aspect, one embodiment of the end terminal for a guardrail system includes an impact head having a flattening device defining a channel that engages and deforms a guardrail beam from a first shape to a second shape as the guardrail beam is moved through the channel between the first and second positions. An anchor is vertically spaced below an outlet and is coupled to an end portion of the guardrail beam. The guardrail beam is bendable in only one rotational direction by the impact head as the guardrail beam exits the outlet and is pulled downwardly by the anchor.

In another aspect, a method of attenuating the energy of a vehicle impacting an end treatment on a guardrail system include impacting the end treatment with the vehicle and thereby moving a flattening device relative to a guardrail beam along a longitudinal axis extending in a substantially horizontal plane. The guardrail beam has a vertical cross section defined by a plurality of inclined web portions joined to define upper and lower peaks and at least one valley positioned between the upper and lower peaks. The plurality of inclined webs includes at least an uppermost web portion and a lowermost web portion. The method further includes engaging the uppermost and lowermost web portions with respective upper and lower forming surfaces defined by a channel of the flattening device. The channel includes an inlet and an outlet vertically aligned along the longitudinal axis. The method further includes bending the guardrail beam at the peaks and at the valley such that the web portions are oriented substantially horizontally one on top of the other as the guardrail beam exits the channel along the longitudinal axis. The method further includes pulling the guardrail beam downwardly after the guardrail beam exits the outlet without engaging a top surface of the flattened guardrail beam with the end treatment after the guardrail beam exits the outlet.

The various embodiments of the end terminal, and the methods for the use and assembly thereof, provide significant advantages over other end terminals. For example and without limitation, the system does not require a threading of any tether, or similar structure, through a downwardly directed channel or chute, with at least an associated two bends, which greatly simplifies the assembly and rehabilitative processes. In addition, the channel can be made linearly, and without a forward/downwardly directed impact surface, which may greatly reduce the time and material costs associated with the manufacturing and assembly thereof. At the same time, the anchor is capable of pulling the deformed guardrail downwardly from the outlet such that the guardrail does not present a spearing or vaulting hazard.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

DETAILED DESCRIPTION OF THE PRESENTLY PREFERRED EMBODIMENTS

It should be understood that the term "plurality," as used herein, means two or more. The term "longitudinal," as used herein means of or relating to length or the lengthwise direction of the guardrail beam, or assembly thereof. The term "lateral," as used herein, means directed between or toward (or perpendicular to) the side of the guardrail system. The term "coupled" means connected to or engaged with, whether directly or indirectly, for example with an intervening member, and does not require the engagement to be fixed or permanent, although it may be fixed or permanent. The term "transverse" means extending across an axis, and/or substantially perpendicular to an axis. It should be understood that the use of numerical terms "first," "second," "third," etc., as used herein does not refer to any particular sequence or order of components; for example "first" and "second" web portions may refer to any sequence of such portions, and is not limited to the first and second web portions of a particular configuration unless otherwise specified.

Figure 1:
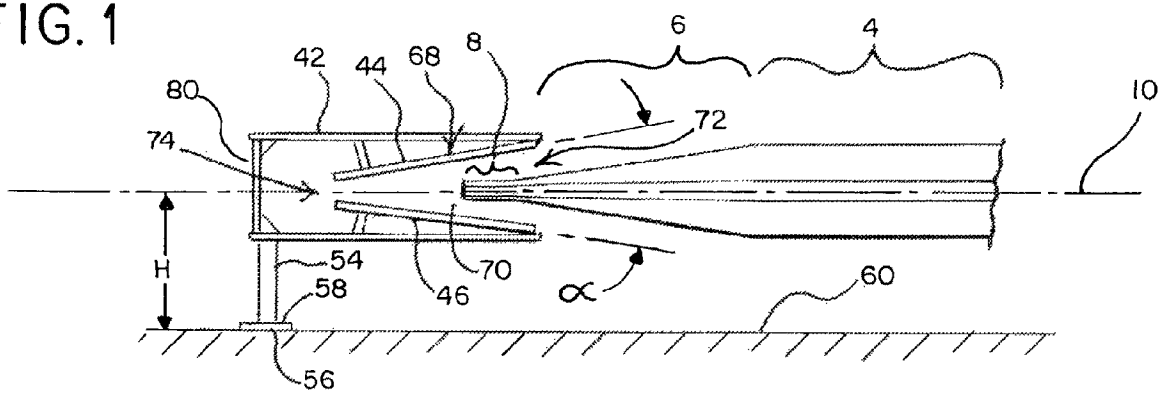
FIG. 1 is a side view of an end terminal including a flattening device and a guardrail beam in a preassembled state.
Figure 3:
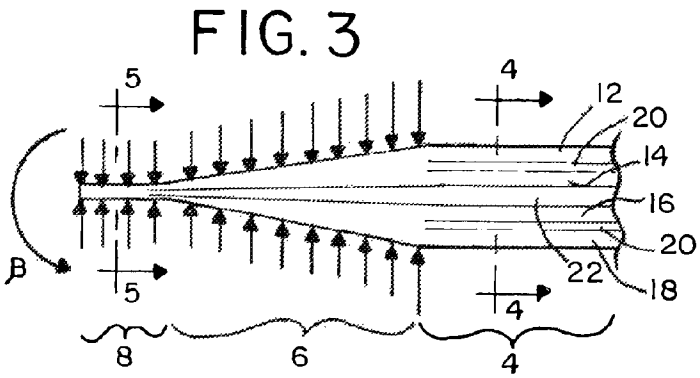
FIG. 3 is a side view of a guardrail beam with a preformed end portion.
Figure 4:
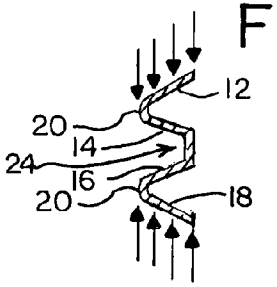
FIG. 4 is a cross-sectional view of the guardrail beam taken along line 4-4 of FIG. 3.

As can be seen in FIGS. 1, 3 and 4, a "W" shaped guardrail beam 2 extends in a horizontal plane and defines a longitudinal axis 10, located proximately along a mid portion of the beam at a height H above the ground. In one embodiment, H is between about 21 and 25 inches. A downstream portion 4 of the guardrail beam has a vertical cross section (see FIG. 4) defined by a plurality of inclined web portions 12, 14, 16, 18, including uppermost and lowermost inclined web portions 12, 18, joined to define upper and lower peaks 20, 22, and at least one valley 24 positioned between the upper and lower peaks. The guardrail beam includes an upstream preflattened end portion 8, wherein the beam has been bent at the peaks and valley such that the web portions 12, 14, 16, 18 are oriented substantially horizontally one on top of the other. A tapered portion 6 transitions between the flattened end portion 8 and the undeformed W-shaped portion 4. The preflattend end portion 8 may be formed using a press (e.g., hydraulic) prior to assembly. The preflattening operation may be performed without providing any weakening of the beam 2, for example by introducing longitudinally disposed slots or openings, and after the beam is galvanized, thereby providing substantial savings of time and money. The beam 2 is preferably made of galvanized steel, although other materials may be suitable.

Figure 2:
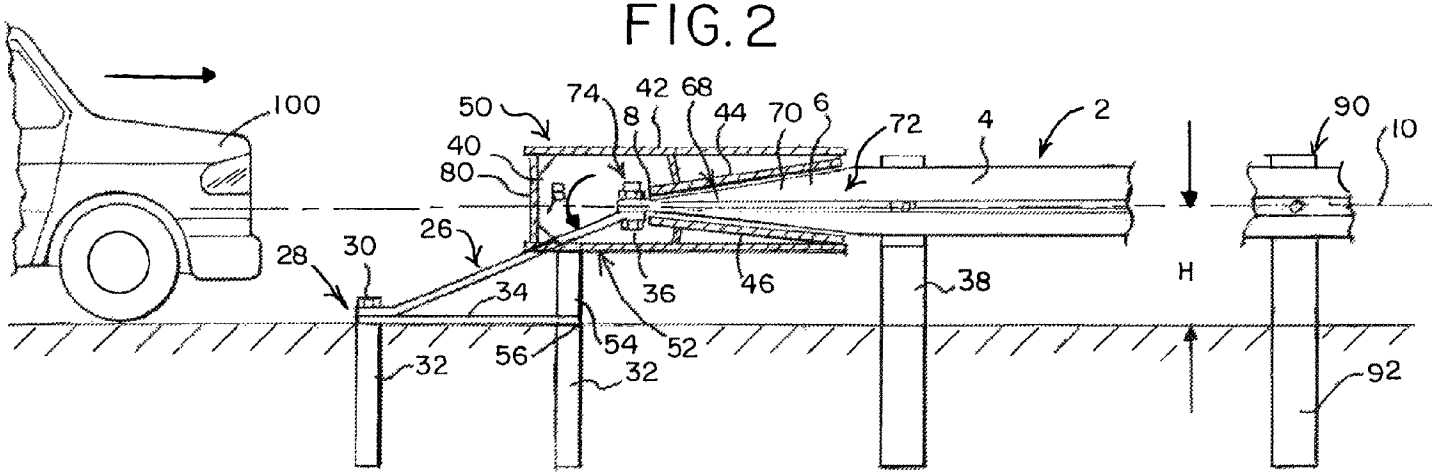
FIG. 2 is a side view of an end terminal including a flattening device and a guardrail beam in an assembled state.

Referring to FIGS. 1 and 2, an impact head 50 includes a housing 42 having *a top, a bottom 52 and a front, which includes* an impact face 40, and a flattening device 68 *disposed in a rear portion of the housing*, or alternatively a reshaping device for those embodiments where the guardrail beams is reshaped but not necessarily flattened. The housing 42 is supported by at least one leg 54, which has a glide foot 56, with an upturned rear lip 58 that facilitates the sliding of the foot 56 along the ground. The housing 42 is open, or includes [an] *a downwardly facing* opening, along the bottom 52 thereof. The bottom *52* of the housing is spaced above the ground between about 12 and 16 inches. The flattening/reshaping device defines a channel 70, or chute, having an inlet 72 and an outlet 74 vertically aligned along the longitudinal axis 10 at the height H. *The housing 42 defines or forms a cavity between the outlet 74 and the impact face 40. The outlet 74 is disposed in the housing 42 and opens into the cavity between the top and bottom 52 of the housing 42 and with the opening along the bottom 52 being in communication with the cavity below the outlet 74. The cavity has a larger dimension, or greater height, than the outlet 74 at a location where the outlet 74 opens into the cavity.* The channel 70 defines vertically spaced upper and lower forming surfaces 44, 46, which are preferably symmetrical about the longitudinal axis 10. The upper and lower forming surfaces 44, 46 are angled toward each other from the inlet 72 to the outlet 74. In one embodiment, the angle $\alpha$ between the surfaces 44, 46 is between about 10 and 30 degrees, and in one embodiment is about 20 degrees. The surfaces are preferably linear, but may be curved, or curvilinear. The flattening or reshaping device may be made of steel, or other suitable materials, and is configured with sufficient strengths to resist deformation due to a reshaping of the guardrail beam.

As shown in FIG. 2, a tether 26 *extends into the cavity defined by the housing 42 and* is secured to the flattened end portion 8, for example with one or more bolts 36 or other suitable fasteners, including without limitation, welding, clamping, crimping, etc., sufficient to resist the tension loads applied during an impact event and to prevent separation of the tether from the end portion. An opposite end of the tether 26 is secured to a ground anchor 28, again with one or more bolts 30 *or* other suitable coupling devices. In one embodiment, the anchor includes a longitudinal plate 34 coupled to a pair of vertically extending posts 32 buried in the ground 60. The tether may be coupled to a front or rear of the anchor. Various anchor systems are shown for example in U.S. Pat. No. 5,078,366 and U.S. Pat. No. 5,797,591, the entire disclosures of which are hereby incorporated herein by reference. In one embodiment, the anchor 28 is horizontally spaced in front of the outlet 74, with the tether 26 forming an oblique angle relative to the surface of the ground 60, or conversely the longitudinal axis 10. Likewise, the impact surface 80 of the impact face 40 is horizontally spaced downstream, or in front of, the outlet 74. The tether 26 extends through the open bottom 52 of the housing.

To assemble the device, the modified guardrail beam 2, having a preflattened end portion 8, is secured to an upstream conventional guardrail system 90, which is otherwise supported by various posts 92. The impact head 50 is then slid, or otherwise positioned, over the end portion 8 and transition portion 6, with the tether 26 then being coupled between the ground anchor 28 and end portion 8. Alternatively, the impact head may remain stationary, with the modified guardrail beam being inserted into the channel.

Figure 5:
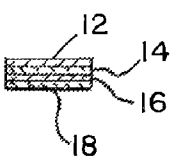
FIG. 5 is a cross-sectional view of the guardrail beam taken along line 5-5 of FIG. 3.
Figure 6:
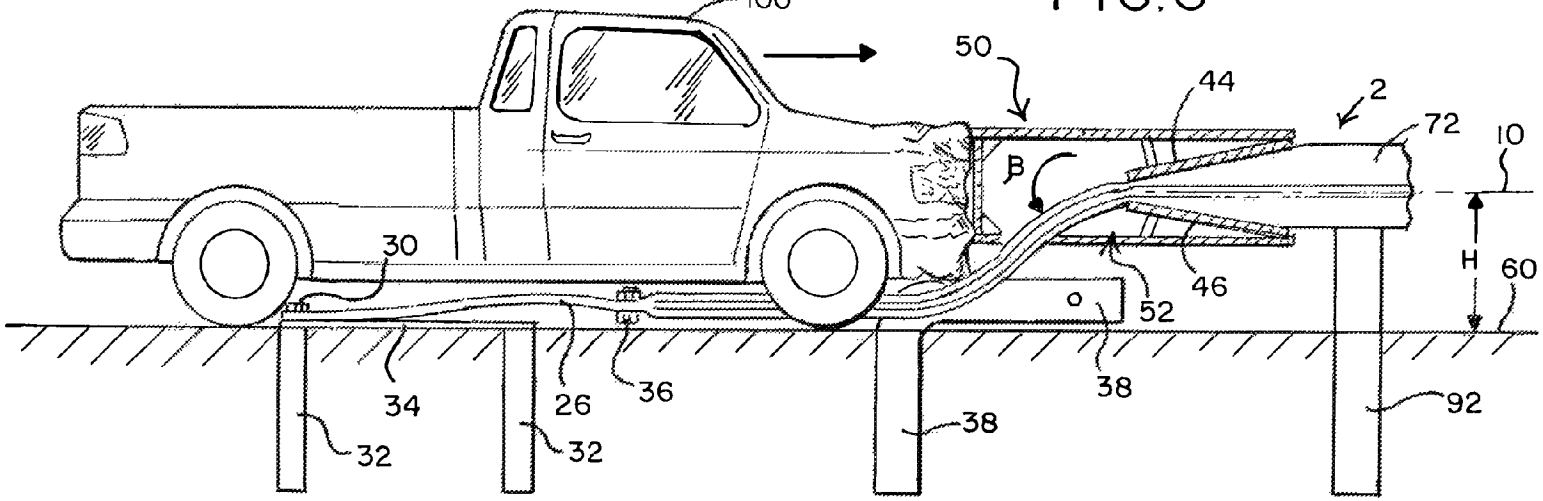
FIG. 6 is a side view of a vehicle impacting one embodiment of the end terminal.

In operation, and during an axial impact as shown in FIGS. 2 and 6, an impacting vehicle 100 engages the *front of the housing 42, or the* impact face 40 *thereof,* and moves the impact head 50, including the flattening/reshaping device 68, relative to the guardrail beam 2 along the longitudinal axis 10 *at the height H which constitutes a first height*. During this movement, the upper and lower impact surfaces 44, 46 engage respectively the uppermost and lowermost web portions 12, 18, or an upper and lower surface of the guardrail beam in other embodiments. As the guardrail 2 moves through the flattening/reshaping device 68 *at the first height H* (*e.g., between about 27 inches and 31 inches*) *from a first position to a second position*, the upper and lower impact surfaces 44, 46 bend the beam 2 at the peaks 20, 22 and valley 24 such that the web portions 12, 14, 16, 18 are substantially horizontal one on top of the other as shown in FIG. 5. It should be understood that, in other embodiments, the flattening device may reconfigure a guardrail beam from a first shape to a second shape, and with the first shape being W-shape or something other than a W-shape (e.g., a tube, rectangle, etc.) and with the second shape being horizontally oriented portions, or something other than horizontally oriented portions, even if the first shape is a W-shape. As the impact head 50 is moved relative to the guardrail beam 2, the tether 26 pulls the flattened or deformed guardrail beam downwardly as it [exist] *exits* the outlet 74 *at the first height H* along the longitudinal axis 10 and through the open bottom 52 of the housing 42. As the tether 26 pulls the flattened or deformed guardrail beam downwardly, the impact head 50 does not otherwise engage a top surface of the uppermost web portion 12, or top surface of the deformed guardrail beam, after the flattened or deformed guardrail beam exits the outlet 74. Put another way, the impact head 50 bends the guardrail beam 2 in only one rotational direction β (counterclockwise/downwardly when viewed as shown in FIGS. 2, 3 and 6) as the flattened or deformed guardrail beam exits the outlet and is pulled downwardly through the opening 52 in the housing by the anchor 26, *with the guardrail beam 2 being redirected below an impact plate defining the impact surface 80.*

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. An end terminal for a guardrail system comprising:

an elongated guardrail beam defining a longitudinal axis extending in a substantially horizontal plane, said beam having a vertical cross section defined by a plurality of inclined web portions joined to define upper and lower peaks and at least one valley positioned between said upper and lower peaks, said plurality of inclined [webs] *web portions* comprising at least an uppermost web portion and a lowermost web portion;

an impact head comprising a housing comprising a top, a bottom and a front defining a cavity and a flattening device disposed within said housing, said front comprising an impact face defining an impact surface adapted to be engaged by an impacting vehicle, and said housing having a downwardly facing opening formed in said bottom thereof, said flattening device defining a channel comprising an inlet and an outlet vertically aligned along said longitudinal axis at a first height, said channel being defined by an upper forming surface and a lower forming surface vertically spaced from said upper forming surface, wherein said outlet is disposed in said housing and opens into said cavity between said top and bottom of said housing, said cavity having a greater height than said outlet at a location where said outlet opens into said cavity, wherein said guardrail beam is moveable along said longitudinal axis through said channel from said inlet to said outlet, and wherein said upper and lower forming surfaces engage respectively said uppermost and lowermost web portions as said guardrail beam is moved through said channel, wherein said upper and lower forming surfaces are configured and arranged such that said plurality of inclined webs are each arranged in a substantially horizontal orientation one on top of the other as said guardrail beam exits said outlet of said channel along said longitudinal axis;

an anchor vertically spaced below said outlet; and a tether coupled between said anchor and an end portion of said guardrail beam located at said first height within said cavity, said tether extending through said opening in said bottom of said impact head and into said cavity and being adapted to pull said guardrail beam downwardly from said first height to a second height vertically spaced from said first height free of any engagement with any other end terminal structure once said guardrail beam exits said outlet.

2. The end terminal of claim 1 wherein said anchor is horizontally spaced in front of said outlet.

3. The end terminal of claim 1 wherein said impact surface is longitudinally spaced from said outlet.

4. The end terminal of claim 3 wherein said guardrail beam is spaced from and is redirected below an impact plate defining said impact surface as said guardrail beam is pulled downwardly to said second height.

5. The end terminal of claim 1 wherein said first height is between about 21 inches and 25 inches.

[6. The end terminal of claim 1 wherein said outlet is defined by an end portion free of any connection to ally other structure.]

7. An end terminal for a guardrail system comprising:

an elongated guardrail beam defining a longitudinal axis extending in a substantially horizontal plane, said beam having a vertical cross section defined by a plurality of inclined web portions joined to define upper and lower peaks and at least one valley positioned between said upper and lower peaks, said plurality of inclined [webs]

*web portions* comprising at least an uppermost web portion and a lowermost web portion;

an impact head comprising a housing having a front, a top, and a bottom forming a cavity *and* having a downwardly facing opening formed in said bottom of said housing, said impact head comprising a [reshaping] *flattening* device disposed within said housing and defining a channel comprising an inlet and an outlet vertically aligned along said longitudinal axis at a first height, said channel being defined by an upper forming surface and a lower forming surface vertically spaced from said upper forming surface, wherein said outlet opens into said cavity between said top and bottom of said housing, said cavity having a greater height than said outlet at a location where said outlet opens into said cavity, wherein said guardrail beam is moveable through said channel at said first height from a first position to a second position in response to an impact from a vehicle, and wherein said channel engages and deforms said guardrail beam from a first shape to a second shape as said guardrail beam is moved through said channel between said first and second positions; and an anchor vertically spaced below said outlet and coupled to an end portion of said guardrail beam via a tether, said tether extending through said opening in said bottom of said impact head and into said cavity and being adapted to pull said guardrail beam downwardly from said first height, and wherein said guardrail beam is bendable in only one rotational direction by said impact head as said guardrail beam exits said outlet and is pulled downwardly by said anchor *through said opening*.

8. The end terminal of claim 7 wherein said anchor is horizontally spaced in front of said outlet.

9. The end terminal of claim 7 wherein said impact [had] *head* comprises an impact face comprising an impact surface longitudinally spaced from said outlet and adapted to be engaged by said impacting vehicle, wherein said cavity is formed between said impact face and said outlet.

10. The end terminal of claim 7 wherein said first height is between about 27 inches and 31 inches.

[11. The end terminal of claim 7 wherein said outlet is defined by an end portion free of any connection to any other structure.]

*12. An end terminal for a guardrail system comprising:*

*an elongated guardrail beam defining a longitudinal axis extending in a substantially horizontal plane, said beam having a vertical cross section defined by a plurality of inclined web portions joined to define upper and lower peaks and at least one valley positioned between said upper and lower peaks, said plurality of inclined web portions comprising at least an uppermost web portion and a lowermost web portion;*

*an impact head comprising a housing comprising a rear portion, a top, a bottom and a front defining a cavity and a flattening device disposed in said rear portion, said front adapted to be engaged by an impacting vehicle, said flattening device defining a channel comprising an inlet and an outlet vertically aligned along said longitudinal axis at a first height, said channel being defined by a first forming surface and a second forming surface spaced from said first forming surface, wherein said outlet opens into said cavity between said top and bottom of said housing, said cavity having a larger dimension than said outlet at a location where the outlet opens into said cavity, wherein said housing comprises an opening in communication with said cavity, wherein said guardrail beam is moveable along said longitudinal axis through said channel from said inlet to said outlet, and wherein said first and second forming surfaces engage said guardrail beam as said guardrail beam is moved through said channel, wherein said first and second forming surfaces are configured and arranged such that said guardrail beam is flattened as said guardrail beam exits said outlet of said channel along said longitudinal axis;*

*an anchor vertically spaced below said outlet; and*

*a tether coupled between said anchor and an end portion of said guardrail beam located at said first height within said cavity, said tether extending through said opening in said impact head and into said cavity and being adapted to pull said guardrail beam downwardly through said opening from said first height to a second height vertically spaced from said first height free of any engagement with any other end terminal structure once said guardrail beam exits said outlet.*

*13. The end terminal of claim 12 wherein said anchor is horizontally spaced in front of said outlet.*

*14. The end terminal of claim 12 wherein said front is longitudinally spaced from said outlet.*

*15. The end terminal of claim 14 wherein said guardrail beam is spaced from and is redirected below an impact plate defining said front as said guardrail beam is pulled downwardly to said second height.*

*16. The end terminal of claim 12 wherein said first height is between about 21 inches and 25 inches.*

*17. An end terminal for a guardrail system comprising:*

*an elongated guardrail beam defining a longitudinal axis extending in a substantially horizontal plane, said beam having a vertical cross section defined by a plurality of inclined web portions joined to define upper and lower peaks and at least one valley positioned between said upper and lower peaks, said plurality of inclined web portions comprising at least an uppermost web portion and a lowermost web portion;*

*an impact head comprising a housing having a front, a top and a bottom forming a cavity and having an opening formed in said housing, said impact head comprising a flattening device defining a channel comprising an inlet and an outlet vertically aligned along said longitudinal axis at a first height, said channel being defined by a first forming surface and a second forming surface spaced from said first forming surface, wherein said outlet opens into said cavity between said top and bottom of said housing, said cavity having a larger dimension than said outlet at a location where the outlet opens into said cavity, wherein said opening is in communication with said cavity, wherein said guardrail beam is moveable through said channel at said first height from a first position to a second position in response to an impact from a vehicle, and wherein said channel engages and deforms said guardrail beam from a first shape to a second shape as said guardrail beam is moved through said channel between said first and second positions; and*

*an anchor vertically spaced below said outlet and coupled to an end portion of said guardrail beam via a tether, said tether extending through said opening in said impact head and into said cavity and being adapted to pull said guardrail beam downwardly through said opening from said first height, and wherein said guardrail beam is downwardly bendable in only one rotational direction by said impact head as said guardrail*

*beam exits said outlet and is pulled downwardly by said anchor through said opening.*

*18. The end terminal of claim 17 wherein said anchor is horizontally spaced in front of said outlet.*

*19. The end terminal of claim 17 wherein said impact head comprises an impact face comprising an impact surface longitudinally spaced from said outlet and adapted to be engaged by said impacting vehicle, wherein said cavity is formed between said impact face and said outlet.*

*20. The end terminal of claim 17 wherein said first height is between about 27 inches and 31 inches.*

* * * * *